United States Patent [19]

Stenkvist

[11] 4,097,978

[45] Jul. 4, 1978

[54] DC ARC FURNACE HEARTH ELECTRODE INSTALLATION

[75] Inventor: Sven-Einar Stenkvist, Västerås, Sweden

[73] Assignee: ASEA AB, Vesteras, Sweden

[21] Appl. No.: 778,471

[22] Filed: Mar. 17, 1977

[30] Foreign Application Priority Data

Mar. 22, 1976 [SE] Sweden .................................. 7603485

[51] Int. Cl.² .............................................. H01J 9/02
[52] U.S. Cl. ........................................ 29/25.14; 13/18
[58] Field of Search ................. 29/25.14, 25.17, 25.18; 228/179, 185; 13/18

[56] References Cited

U.S. PATENT DOCUMENTS 4,044,218  8/1977  Olson et al. ...................... 228/179 X Primary Examiner—Richard B. Lazarus
Attorney, Agent, or Firm—Kenyon & Kenyon, Reilly, Carr & Chapin

[57] ABSTRACT

A direct current electric arc furnace hearth connection of the liquid-solid type is initially installed as a metal billet in an opening in a furnace construction, with water-containing refractory material rammed around the billet. To accelerate drying of the rammed water-containing or moist refractory forming a lining around the billet, metal channels are fixed to the sides of the billet to form longitudinally extending passages interjoined at one end of the billet by one or more transverse holes formed through the billet, so that a U-shaped overall passage is formed. A gas flame is burned at one end of the passage and the resulting hot gases are sucked through the U-shaped passage heating the billet to dry the rammed refractory material.

4 Claims, 4 Drawing Figures

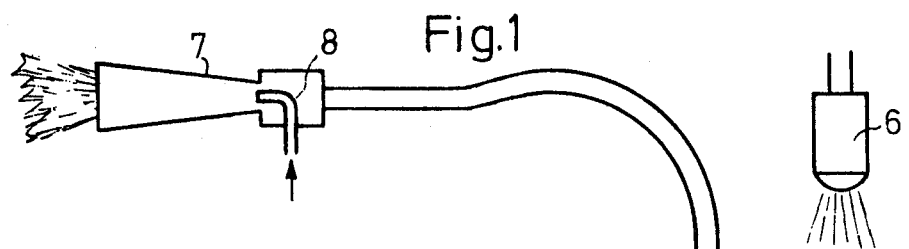
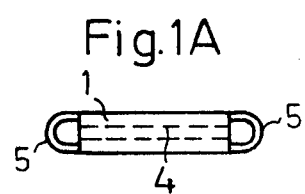
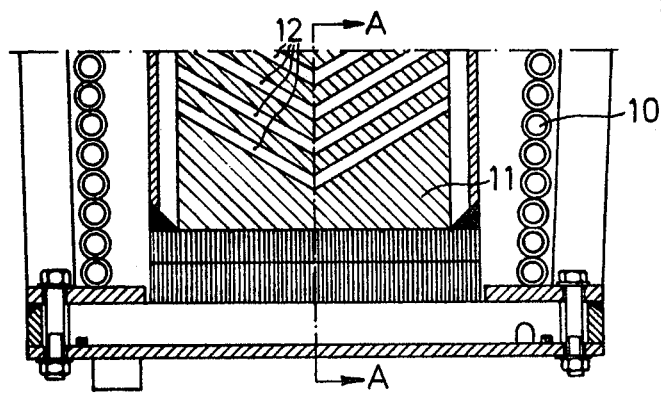
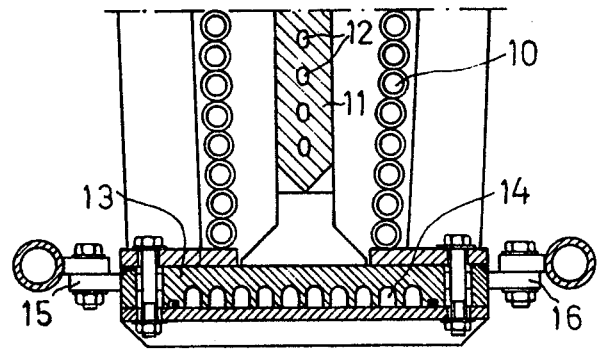

DC ARC FURNACE HEARTH ELECTRODE INSTALLATION

BACKGROUND OF THE INVENTION

A direct current arc furnace requires conduction of the electric arc current through the melt in the hearth of the furnace, in the usual arrangement where the melt has one polarity and the arcing electrode or electrodes have the other polarity. To make the hearth itself electrically conductive for this purpose, is generally considered to be unsatisfactory for various reasons.

Therefore, hearth electrodes of the liquid-solid type have been suggested by the prior art as exemplified by U.S. Pat. No. 3,789,127, dated Jan. 29, 1974, and in a much improved form, by the U.S. Stenkvist U.S. Pat. No. 3,997,712. The electrode may be curved or straight and free from curvature.

The above type is exemplified by a steel billet extending through a furnace construction and having an inside end positioned for contact by a steel melt in the furnace and an outside end provided with cooling means. In operation, the inside end portion melts to the steel's liquid phase, but the steel billet remaining solid from its outer end and safely inwardly towards its inside end, by being cooled, as by water-cooling, the solid outside end being available to form an electrical connection with a direct current power source which is, of course, also connected to an arcing electrode or electrodes.

To accommodate such a hearth electrode, the furnace vessel is constructed with a suitably located passage for insertion of the billet. This passage may be formed by an outwardly extending, possibly removable, extension of the usual steel shell containing the refractory forming the furnace bottom construction.

With the billet positioned in the furnace vessel passage, refractory material in a generally plastic or moldable state, is rammed into the passage or opening around the billet throughout the length of the billet which must extend through the furnace hearth or wall.

The refractory material may, for example, be a magnesite compound made in a plastic or moldable condition by being mixed with water. Therefore, the refractory used to fill the space around the electrode or billet formed by the furnace construction opening, which for practical reasons has a cross sectional area substantially larger than does the billet, is moist in the case of any new electrode installation and requires thorough drying before the furnace can be put into operation.

Heretofore, to dry the rammed and moist refractory around the billet in a new installation, it has been customary to heat the inside end of the billet, not required for an electrical connection with a power line, so that by conduction throughout the billet the necessary drying process is hopefully accelelerated. However, steel has a relatively low thermal conductivity, so the conduction of heat throughout its length is relatively poor, making the drying undesirably slow.

As disclosed in the Fredrikson et al Ser. No. 672,305, filed Mar. 31, 1976, and assigned to the assignee of the present application, a hole is formed throughout the length of the steel billet. Incidentally, the term "steel" is intended to mean not only the plain carbon steel or steel alloys, but iron as well. In other words, the steel billet is internally formed to provide for the conduction of gases throughout the length of the billet. The billet or hearth electrode can be a casting, so any hole formed through it need not necessarily be circular. However, whether formed as a casting or a forged billet which is drilled lengthwise, the construction of such a hearth electrode having an internal lengthwise gas passage, involves undesirable technical problems.

The advantage of such a billet now able to conduct gases, is that the gas flame can be burned at the inside end, free from the billet's outside end where the electric line connection must be made, while at the outside end suction is applied to draw the hot gases thus produced, continuously throughout the length of the billet, thus heating the billet throughout its length.

SUMMARY OF THE INVENTION

According to the present invention, a solid steel billet which can be a conventional rolled shape can be used without the necessity for being drilled lengthwise to form the internal gas passage described hereinabove.

Instead of such a longitudinal passage, one or more transverse holes are formed through the otherwise solid billet adjacent to one of its ends. Being transverse holes, the holes are of relatively short lengths and can be easily drilled without technical difficulties. At least two metal channels are formed, each having a length substantially as long as the billet. These channels are fixed as by welding to the sides of the billet with the channel's open sides facing the billet and respectively overlying opposite ends of the transverse hole or holes. The respective ends of the channels adjacently beyond the hole or holes are closed and the billet and channels are then surrounded with the moist refractory while leaving the channels with open ends remote from the hole or holes. In this way a U-shaped passage is formed via in the channels and the hole or holes and it is through this channel that the hot gases are passed to heat the billet until the refractory is satisfactory dried.

The steel billet may have a flat rectangular cross section typical of a rolled steel product. In such a case the hole or holes are formed through the narrower sides of the billet and the channels are fixed to those narrower sides. To avoid unduly reducing the overall electrical conductivity of the billet, a longitudinally extending series of the transverse holes can be used with each hole individually of relatively small diameter, the series of holes collectively providing for an adequate flow capacity at the end of the billet, the channels functioning as manifolds for the series or group of holes.

Resistance to the gas flow can be further reduced by forming each of the transverse holes by drilling the billet inwardly from opposite sides angularly towards the end of the billet to which the hole is adjacent and so as to form intersecting drill holes which together form the transverse passage. This avoids the need for the flow of gases to make completely right angular turns, thus reducing the gas flow resistance while incidentally making the drilling technically easier.

BRIEF DESCRIPTION OF THE DRAWINGS

An example of the present invention is illustrated by the accompanying drawings in which:

FIG. 1 schematically illustrates the heating operation when the billet is heated to dry the moist refractory surrounding the billet;

FIG. 1a is an upwardly looking end view of the billet and channels shown in FIG. 1;

FIG. 2a in vertical section shows the bottom end of a detailed version of the invention; and FIG. 2b is a section taken on line A—A in FIG. 2a.

DETAILED DESCRIPTION OF THE INVENTION

In FIGS. 1 and 1a a flat rectangular rolled steel billet 1 is surrounded by the rammed moist refractory 2 outwardly of which a water-cooled pipe coil 3 is positioned, the necessarily surrounding steel sheel retaining these components together not being shown. Two of the transverse drilled holes are indicated at 4, these being drilled at downward angularities from opposite sides of the billet 1 via the billet's narrow sides. The channels are shown at 5 with their edges welded to the narrow sides of the billet 1, the open sides of the channels facing the billets sides and overlying the holes 4 whereby to provide the U-shaped passage.

To provide a source of hot gases, a gas burner 6 is shown above one of the legs of the U-shaped passage, the other leg being connected with an aspirator 7 powered by a compressed air nozzle 8, whereby to such the gases from the burner 6 through the U-shaped passage, thus effectively heating the billet 1 throughout its entire extent.

The lower ends of the channels 5 can be closed by welded ends or by relying on the moist refractory material 2 which is rammed tightly around the billet and channels.

In FIG. 1 the electrical contact plate is shown at 8 and the flange 9 is indicated, such a flange being used to attach the electrode assembly to the furnace. It is to be understood that FIG. 1 is schematic. In actual practice the billet 1 would project high enough above the flange 9 to project through the furnace hearth refractory (not shown) via a hole in this refractory which is closed around the projecting end of the billet by rammed moist refractory.

In FIGS. 2a and 2b the water-cooling coil is shown at 10 and the billet at 11, the transverse holes, of which there is a series 12 of four, extending longitudinally with respect to the billet, and being also shown in some detail with their typical V-shapes resulting from the downward angular drilling of the intersecting holes via the narrow sides of the rectangular billet. The electrical connection is shown at 13 with its water-cooling passages 14 and connection terminals 15 and 16. This is one way in which electrical connection is established with the billets 1 or 11.

After the new electrode assembly is formed with the billet or electrode having the moist refractory rammed around it and the channels 5, the gas burner 6 is used, together with the aspirator 7, to suck the hot gases downwardly through one of the legs of the U-shaped passage formed by the channels and the transverse holes through the billet, the gases going from the bottom of that leg transversely through the holes and up through the other leg of the passage and from the upper end of which gases are sucked by the aspirator.

After the installation is dried and a melt is formed in the furnace using the new installation, the melt can, of course, run downwardly in the channels 5, but due to the cooling via the cooling coils 3 or 10, the melt quickly freezes and blocks off the channels 5. After that, the channels are no longer usable as gas passages nor are they needed for that purpose; it is to be noted that these metal channels 5, if made with adequately thick walls and being welded throughout their lengths to the narrow sides of the billet 1 and 11, form electrically conductive shunts around the holes 4 or 12, thus reducing the loss of conductivity caused by the formation of the transverse holes. Because the transverse holes are individually of small diameter they do not cause an impractical conductivity loss in any event.

I claim:

1. A method for drying a new hearth electrode for a DC electric arc furnace, the new electrode comprising a metal billet extending through a wall portion of the furnace, the billet having an inside end which will be contacted by a melt in the furnace during operation of the furnace, and an outside end for an electrical connection, and at least slightly moist refractory surrounding the billet; said method comprising prior to surrounding the billet with the moist refractory forming at least one transverse hole through said billet adjacent to one of its ends, forming at least two metal channels having lengths substantially as long as the billet and fixing the channels to the billet with the channel's open sides facing the billet and respectively overlying opposite ends of said hole, closing the ends of the channels adjacently beyond said hole and surrounding the billet and channels with the moist refractory while leaving the channels with open ends remote from the hole, whereby to form a U-shaped passage via the channels and said hole, and passing hot gas through said passage to heat the billet until the refractory is substantially dried.

2. The method of claim 1 in which said hole is formed by drilling said billet inwardly from opposite sides of the billet angularly towards the end of the billet to which said hole is adjacent and so as to form intersecting drill holes.

3. The method of claim 1 in which said billet has a flat rectangular cross section and said hole is formed through the narrower sides of the billet and said channels are fixed to those narrower sides.

4. The method of claim 1 in which a series of said holes is formed through the billet, the series extending in the lengthwise direction of the billet and each hole being of relatively small diameter as compared to the cross-sectional size of the billet, whereby to avoid excessive reduction in the billet's electrical conductivity while providing a total gas flow capacity compatible with that of said channels.

* * * * *